(12) United States Patent
Tealdi et al.

(10) Patent No.: US 8,978,506 B2
(45) Date of Patent: Mar. 17, 2015

(54) MANIPULATOR ROBOT

(75) Inventors: Igor Tealdi, Grugliasco (IT); Enrico Mauletti, Grugliasco (IT)

(73) Assignee: Comau S.p.A., Grugliasco Torino (IT)

( * ) Notice: Subject to any disclaimer, the term of this patent is extended or adjusted under 35 U.S.C. 154(b) by 471 days.

(21) Appl. No.: 13/368,388

(22) Filed: Feb. 8, 2012

(65) Prior Publication Data

US 2012/0216646 A1 Aug. 30, 2012

(30) Foreign Application Priority Data

Feb. 24, 2011 (IT) ............... TO2011A0159

(51) Int. Cl.
*B25J 18/04* (2006.01)
*B25J 9/00* (2006.01)

(52) U.S. Cl.
CPC .............. *B25J 9/0084* (2013.01); *B25J 9/0018* (2013.01); *B25J 9/0087* (2013.01); *Y10S 901/28* (2013.01)
USPC .......................................... 74/490.01; 901/28

(58) Field of Classification Search
CPC ....... B25J 9/0087; B25J 9/0018; B25J 9/0084
USPC ......................................... 901/28; 74/490.01
See application file for complete search history.

(56) References Cited

U.S. PATENT DOCUMENTS

| | | | |
|---|---|---|---|
| 4,046,262 | A * | 9/1977 | Vykukal et al. ............. 414/5 |
| 4,762,455 | A | 8/1988 | Coughlan et al. |
| 2007/0193016 | A1 | 8/2007 | Kondo et al. |
| 2012/0263519 | A1 * | 10/2012 | Kotula et al. ............... 403/84 |

FOREIGN PATENT DOCUMENTS

| | | |
|---|---|---|
| JP | 60-175594 | 9/1985 |
| JP | 07-308877 | 11/1995 |
| JP | 2007-118177 | 5/2007 |
| JP | 2010-105106 | 5/2010 |
| WO | 2007-037130 A1 | 4/2007 |

OTHER PUBLICATIONS

Italian Search Report, Dated Aug. 10, 2011.

* cited by examiner

*Primary Examiner* — David M Fenstermacher
*Assistant Examiner* — Terence Boes
(74) *Attorney, Agent, or Firm* — Young Basile Hanlon & MacFarlane P.C.

(57) ABSTRACT

A manipulator robot for industrial production lines including a support structure and two robot arms mounted to the support structure at declining and diverging angles from one another. In one example, each robot arm includes six robot body portions connected in series and rotatable relative to one another. The improved robot design provides significant advantages in the flexibility, movement and modality of the robot for exemplary use in industrial production lines.

18 Claims, 10 Drawing Sheets

MANIPULATOR ROBOT

FIELD OF INVENTION

The present invention generally relates to the field of robotic devices.

BACKGROUND

In industrial manufacturing and assembly, electro-mechanical robots are often used to manipulate and connect individual components and subassemblies to form large, complex devices, for example, motor vehicles. An example of a manipulator robot is described in the international patent application No. WO2007/037130. The robot in this example generally includes A support structure, first and second robot arms each having several arm portions that are connected and are rotatable with respect to one another, the arms connected to the support structure so the arms define a first axis of rotation that extend in respective first and second directions with respect to the support structure.

An object of the present invention is to propose an improvement to prior designs by providing a manipulator robot in which the first and second arms are able to cooperate with each other in a more efficient and versatile way.

SUMMARY OF INVENTION

Disclosed is a manipulator robot for exemplary use in an industrial production line or plant facility. In one example of the invention, the robot includes a support structure having a first arm and a second arm which are connected to the support structure in an orientation in a first direction and a second direction respectively which provides improved flexibility, movement and modality in functional use of the robot. In a preferred example, the first and second directions are inclined toward the support structure, divergent downward away from the support structure and are angularly separated from one another.

In one example, each of the first and second robot arms include six body portions each connected in a series with one another and are rotatable about respective axes of rotation with respect to one another.

In another example, two of the body portions for each arm are at least 1½ times longer than at least one of the other body portions in the respective arm.

In another example, one of the arm portions comprises a first and second portion which are rotatable with respect to one another defining a seventh axis of rotation for the arm.

In one example, the support structure includes a first and a second inclined wall for connection of the respective first arm and second arm to the support structure in a cantilever-type orientation. The first and second inclined walls, and connection of the respective arm thereto, defines the respective first direction and the second direction for the arm.

In another example, the support structure is connected to an overhead support to suspend the robot from the support.

In another example, the overhead support or robot is connected to a vertical pillar or post to support the overhead support that is supporting the robot.

In one example, the manipulator robot is in electronic communication with a controller which includes preprogrammed instructions for selected movement of the robot.

BRIEF DESCRIPTION OF THE DRAWINGS

The invention will now be described, purely by way of non-limiting example, with reference to the annexed representations, wherein.

DETAILED DESCRIPTION OF EMBODIMENTS

In the ensuing description illustrated in FIGS. 1-10, various specific details are illustrated aimed at an in-depth understanding of the embodiments. The embodiments can be provided without one or more of the specific details, or with other methods, components, or materials, etc. In other cases, known structures, materials, or operations are not shown or described in detail to prevent the various aspects of the embodiments from being obscured.

The references used herein are exemplary and only provided for convenience and hence do not limit the sphere of protection or the scope of the embodiments.

Referring to FIGS. 1-10, designated by the reference number 10, are examples of a manipulator robot designed to operate in the field of industrial production lines, for example, lines for the production of motor vehicles.

Figure 1:
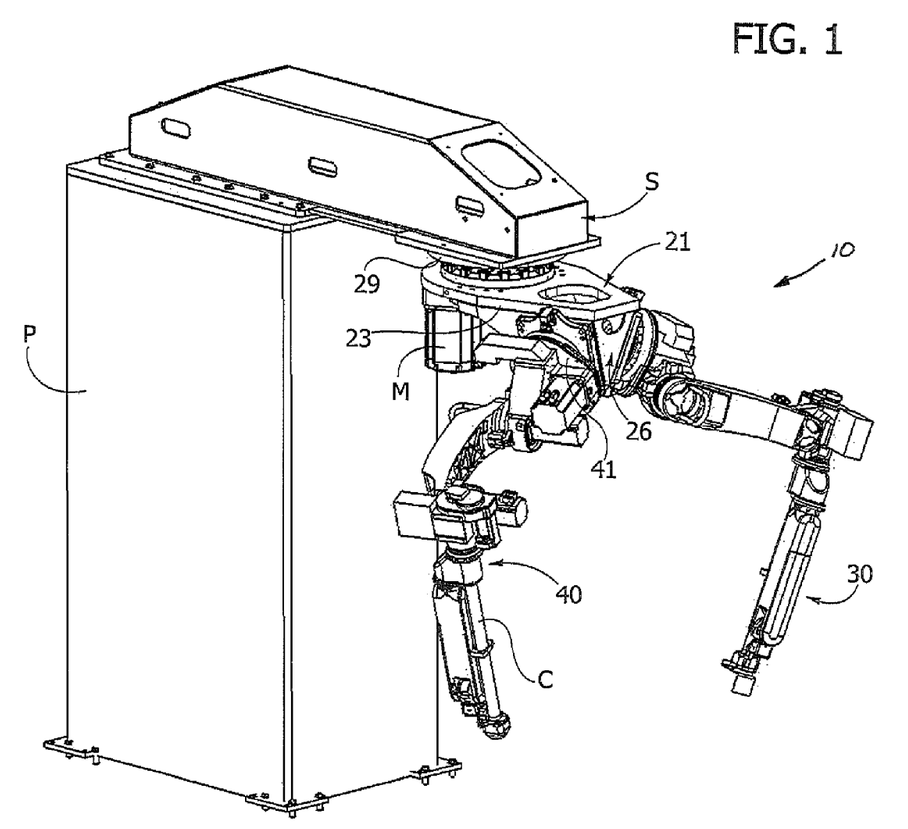
FIG. 1 is a schematic perspective view of an example of working area equipped with a manipulator robot of the type described herein.
Figure 2:
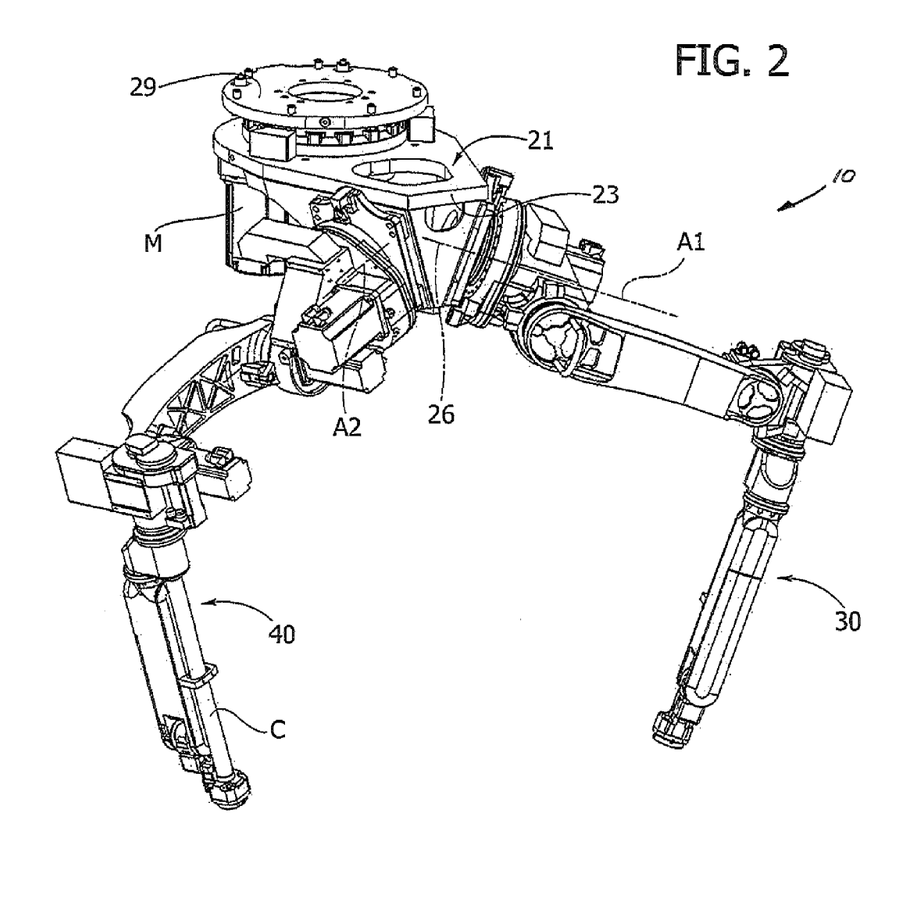
FIG. 2 is a partial perspective view of the manipulator robot in FIG. 1.
Figure 3:
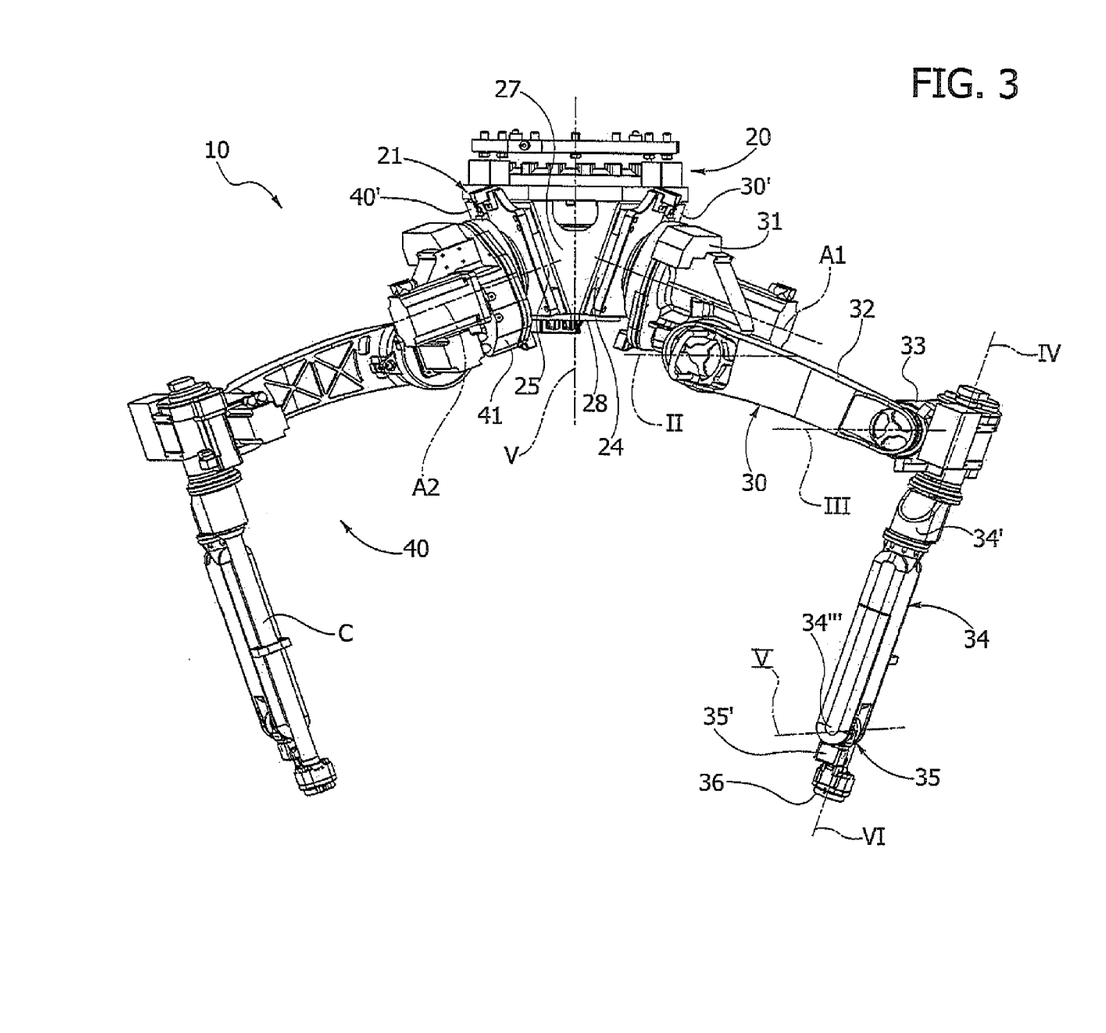
FIG. 3 is a front view of the manipulator robot of FIG. 2.

As best seen in FIG. 3, the robot 10 comprises a supporting structure 20 and a first arm 30 and a second arm 40, mounted on said structure. As may be seen in said figures, in the manipulator robot described herein the supporting structure is such as to keep the arms suspended over the working area in which the manipulator robot is designed to operate. As shown in FIG. 1, the specific example illustrated, the supporting structure 20 is fixed to an overhead portion S of a column P set in a position corresponding to the working area. Said supporting structure can alternatively be fixed to an overhead structure S, which extends above the working area.

The two robot arms 30, 40 mounted on the supporting structure are pre-arranged for co-operating with one another in the execution of one or more given operations on one or more components being processed (not shown). Control means (not shown) are operatively connected to the manipulator robot for controlling, according to pre-set instructions that are associated to each operation, the two arms, as well as possible further operating units of the robot 10. For example, said control means can be set within the aforesaid column P.

Each arm 30, 40 comprises a plurality of bodies set in series and rotatable with respect to one another and with respect to the supporting structure about respective axes of rotation. Each arm further respectively comprises a base portion 30', 40' designed to be fixed to the supporting structure 20 and designed to carry the series of rotatable bodies of its respective arm.

The structure of the arms will be described in detail hereinafter. It should in any case at once be noted that the type of the arms that come to make up the manipulator robot 10 are exemplary and take other structures, forms and orientations known by those skilled in the art.

The manipulator robot described herein envisages purposely provided means for mounting the two arms 30,40 on the supporting structure 20 according to a specific orientation in space.

Figure 4:
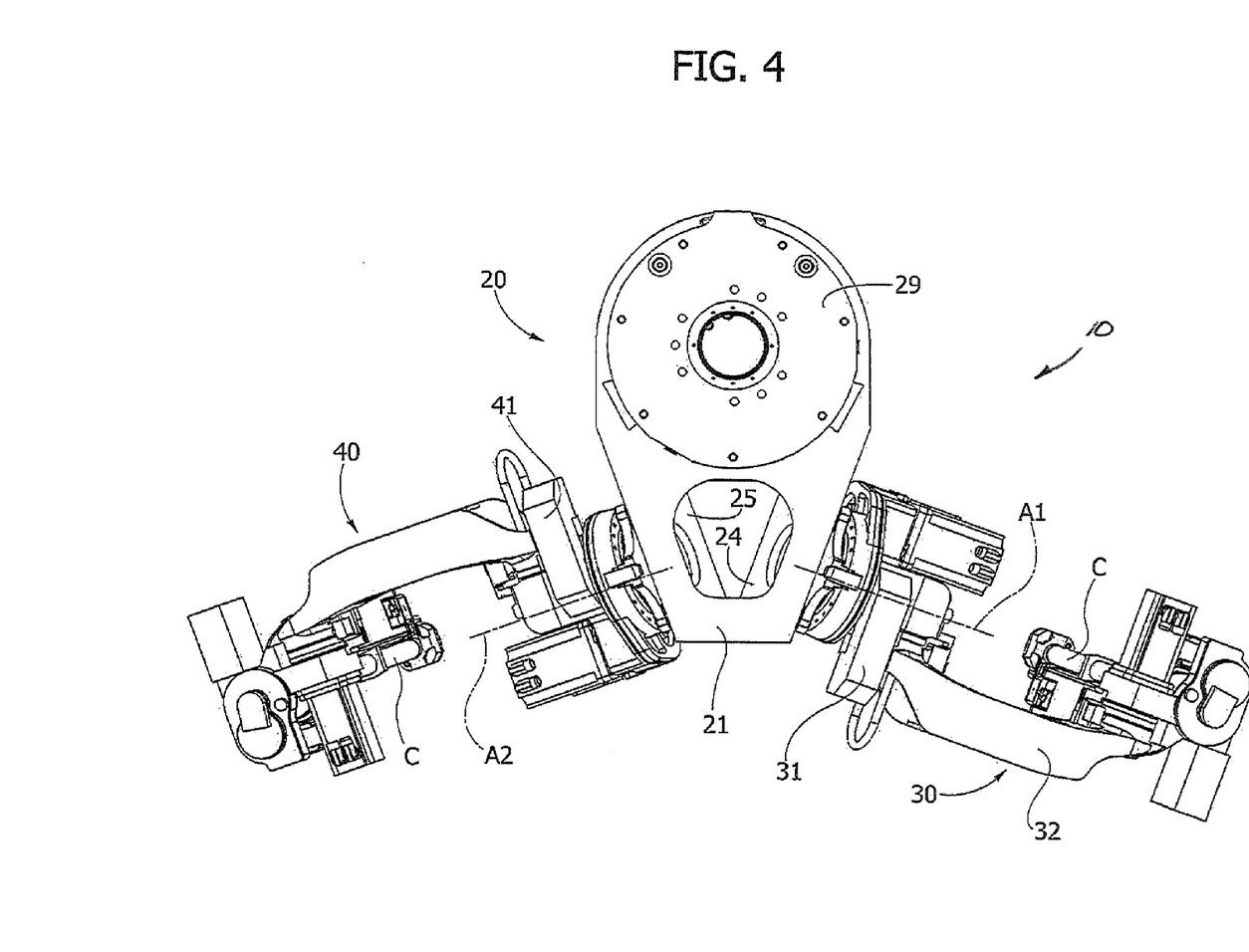
FIG. 4 is a top plan view of the manipulator robot of FIG. 2.
Figure 5:
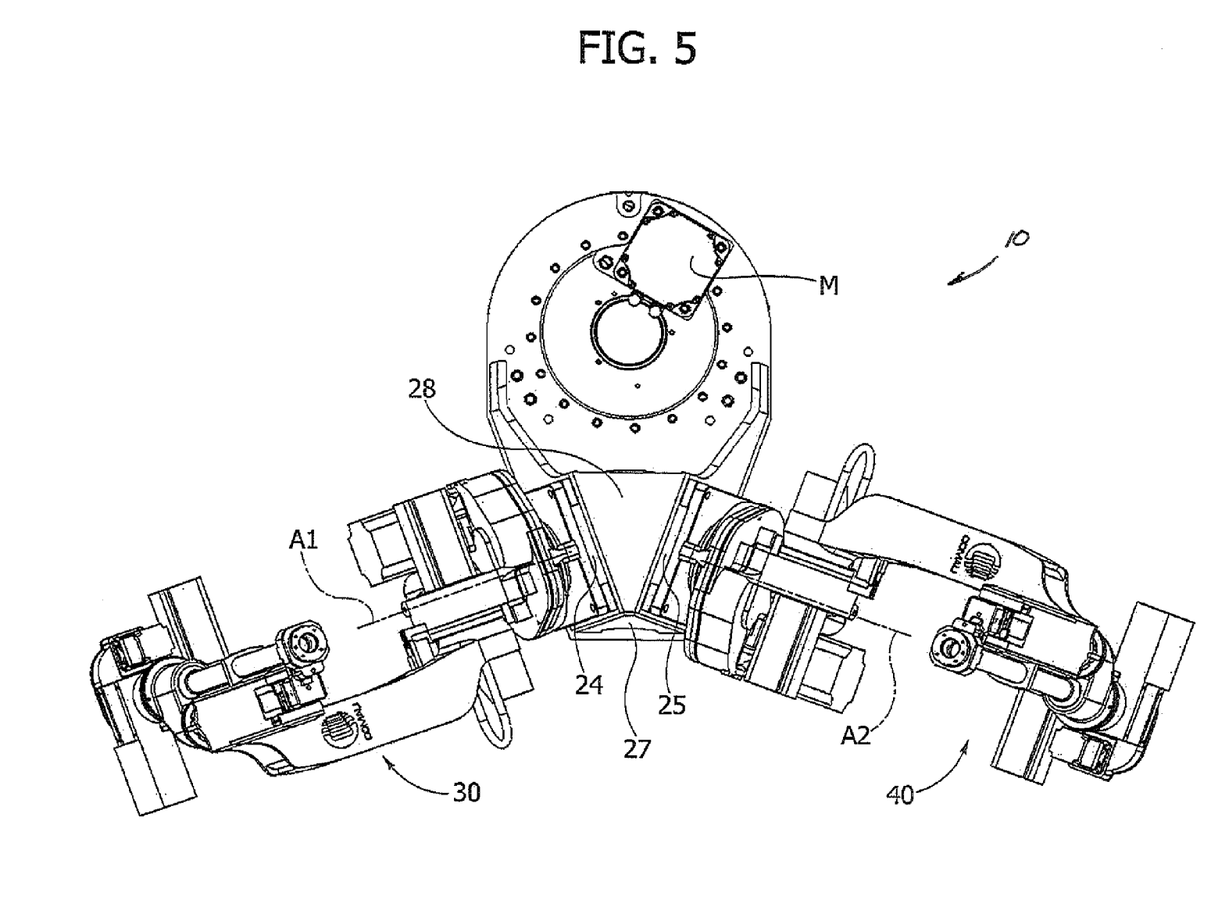
FIG. 5 is a view from beneath the manipulator robot of FIG. 2.
Figure 6:
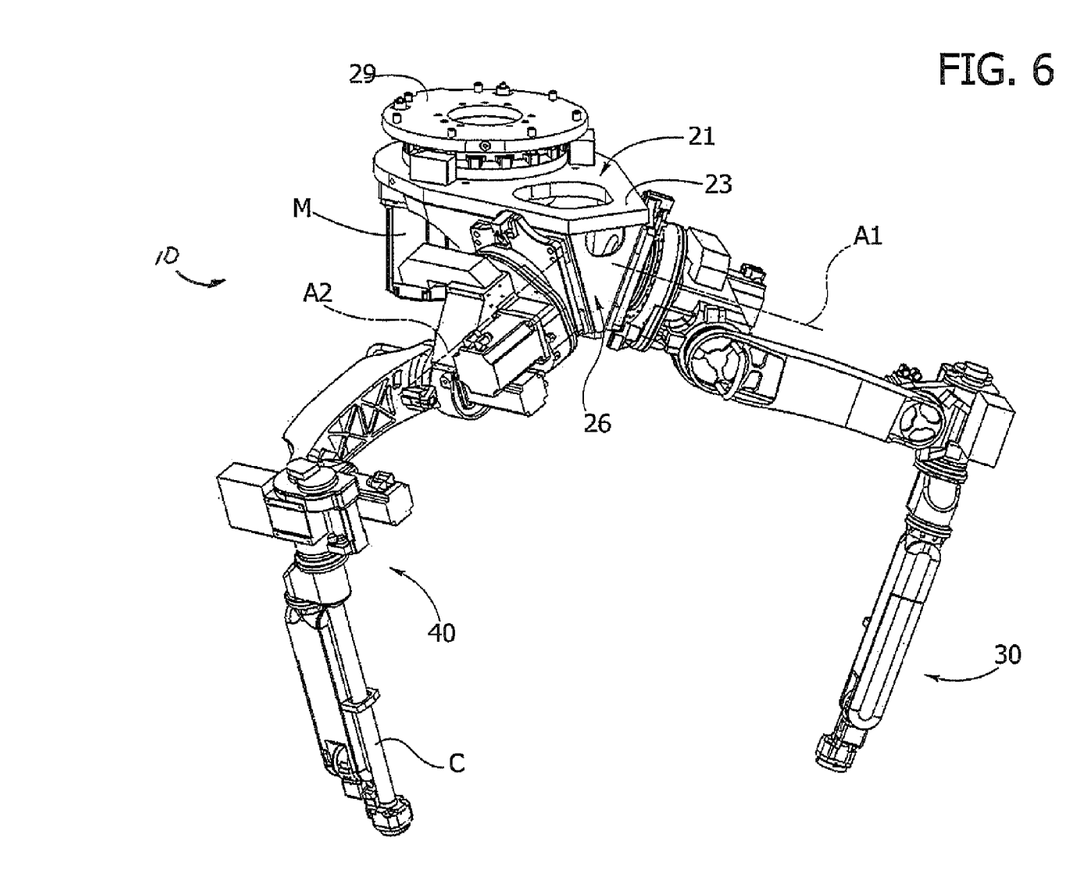
FIG. 6 is a perspective view of the manipulator robot described herein according to an alternate embodiment.
Figure 7:
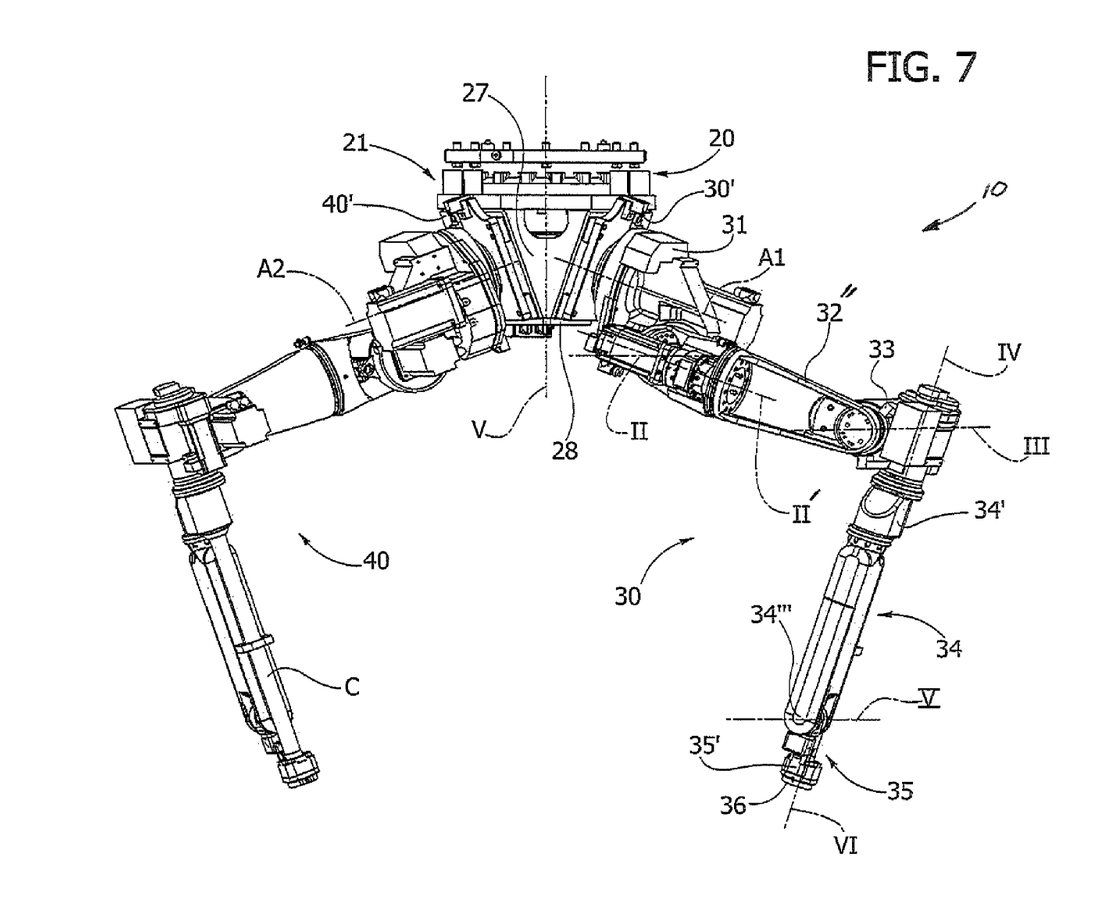
FIG. 7 is a front view of the manipulator robot of FIG. 6.

As best seen in FIGS. 3 and 4, said means are designed to orient the rotatable body of the first arm 30 that is closest to the supporting structure (designated by the reference number 31 in the example of the figures) in such a way that its respective axis of rotation is set in a first direction A1, and, likewise, to orient the rotatable body of the second arm 40 that is closest to the supporting structure (designated by the reference number 41 in the example of the figures) in such a way that its respective axis of rotation is set in a second direction A2 different from the aforesaid first direction A1. The aforesaid means are such that the first A1 and second A2 directions are inclined and divergent downwards.

According to preferred embodiments, the first A1 and second A2 directions are both inclined with respect to a horizontal plane by an angle of between 0° and 90°, extremes excluded. Moreover, according to preferred embodiments, the first and second directions define between them an angle comprised between 90° and 180°, extremes excluded. Preferably, the first A1 and second A2 directions are symmetrical to one another with respect to an intermediate vertical geometrical plane.

The orientation of the two arms 30,40, described above, represents an innovative configuration as compared to those proposed by the known art. In fact, it is to be noted that from the inclination of the first rotatable body of the arms there depends the configuration that these assume for reaching the various operative positions in space and, in this connection, the present applicant has found that the specific orientation described herein allows the arms 30,40 greater possibilities and modalities of coordinated intervention given the same amount of free space for movement thereof. As will be seen in what follows, the above and further advantages are even more evident in applications where the arms 30,40 each comprise at least six rotatable bodies, two of which are preferably elongated bodies.

The means for mounting the two arms 30,40 according to the orientation indicated above can be of any configuration suited for the purpose as known by those skilled in the art. Said means comprise purposely provided portions, which thanks to their specific configuration determine said orientation and which can be provided on the supporting structure, or alternatively, on the respective base portion 30',40' of the arms 30,40 themselves.

A particularly advantageous embodiment of the supporting structure 20 and of the aforesaid means for mounting the arms on said structure will be illustrated hereinafter.

In various embodiments, as in the one illustrated, the supporting structure comprises a platform 21 mounted on which are the two arms 30, 40.

In various embodiments, as in the one illustrated in FIGS. 1-5, the platform 21 is mounted so that it can turn, about a vertical axis V, on a fixed part of the supporting structure. In preferred embodiments, as in the one illustrated, said platform has a plate 22, which is mounted so that it can turn about the aforesaid vertical axis V in a position corresponding to a connection portion thereof, and extends from said connection portion with a projecting part 23 on which the two arms of the manipulator robot are mounted in respective positions in cantilever fashion with respect to the aforesaid vertical axis.

In various embodiments, as in the one illustrated, the supporting structure further comprises a flange 29 for fixing said structure to an overhead wall or portion S, for example, as mentioned previously, or to an overhead structure set in a position corresponding to the working area. In addition, said same structure 20 carries the actuator or motor M designed to drive the platform 21 in rotation.

In various embodiments, as in the one illustrated in FIGS. 1-5, the platform 21 has a first plane and inclined wall 24 fixed on which is the base portion 30' of the first arm and a second plane and inclined wall 25 fixed on which is the base portion 40' of the second arm. Said walls are inclined in such a way that respective geometrical axes orthogonal thereto identify the aforesaid first A1 and second A2 directions. It is evident that in this case it is the specific configuration of the structure on which the arms are fixed that determines the specific orientation of the latter, and, consequently, the base portion or portion of attachment of the arms themselves can be of any type conventionally used in said field. For example, said portion can be provided with a flange suited for being fixed to said walls via bolts or equivalent fixing means.

In various embodiments, such as in the one illustrated in FIGS. 1-5, the first and second walls are defined by two opposite oblique sides of a half-shell structure 26 anchored to the bottom of the platform 21. Said half-shell structure 26 moreover has a front side 27 substantially shaped like a triangle or trapezium set upside down, and a base side 28, which is also shaped like a triangle or trapezium, substantially parallel to said plate and orthogonal to the front side, which bears upon the front side so as to turn its vertex or distal minor base (i.e., the one furthest from the vertical axis of rotation of the platform) towards the bottom vertex or minor base of the front side. Said sides connect the aforesaid opposite oblique sides together. It should be noted how, thanks to the specific configuration described above, the desired inclinations of the first 24 and second 25 walls can be obtained in a precise way simply via an appropriate construction of the aforesaid triangular (or trapezial) sides.

As a whole, the configuration described above enables a platform structure where the robot arms are to be anchored to be obtained that is resistant and at the same time far from cumbersome and is hence particularly suited for the applications where it is envisaged that said platform will turn about the vertical axis V. In addition, thanks to the fact that the platform structure itself determines, via the inclined walls 24,25, the desired orientation of the arms 30,40, it enables also use of conventional robot arms, for example of a type suitable also for being mounted in a condition turned upside down with respect to the one illustrated (like the arms of the example illustrated), with their base that rests in a horizontal plane. Consequently, the advantages that said structure affords in terms of line flexibility and of management of the magazine are evident.

As has been already emphasized, and may moreover be inferred from the foregoing, the specific type of robot arms may vary as compared to the main characteristics of the exemplary manipulator robot 10 described herein, which, it is recalled, regard the specific orientation of said arms in space. However, as has already been mentioned previously, the present applicant has found that the use, in the framework of such a solution, of robot arms 30,40 each provided with a series of at least six bodies rotatable with respect to one another, two of which are preferably elongated and set at a distance from each other by at least one of the other bodies of the series, enables a particularly versatile manipulator robot to be obtained, which is able to operate according to a wide range of modalities. In various embodiments, as in the one illustrated in FIGS. 1-5, the elongated bodies referred to above have a length that is at least one and a half times the length of each of the remaining bodies of the series.

There now follows a description, in the general terms that may be of interest herein, of a particularly preferred type of robot arm, which, in FIGS. 2 to 5, is illustrated in its first specific embodiment, whereas illustrated in the embodiments of FIGS. 6 to 10 is an alternate second specific embodiment thereof. For convenience of treatment, specific reference will be made to the first arm 30, taking into account the fact that in the embodiment illustrated in the figures the first 30 and second 40 arms are identical to one another.

With reference to FIGS. 2 to 5, starting from the base portion 30' anchored to the supporting structure 20, the robot arm 30 comprises a first rotatable body 31, which is carried by said base 30' and the axis of rotation of which (representing the first axis of rotation of the robot arm) is, for what has been said previously, set in the first direction A1. Preferably, mounted on said first body 31 are both the motor that is designed to drive it in rotation and the motor that is designed to drive in rotation a second body 32 of the robot arm 30. Alternatively, the motor designed to drive the first body 31 can be carried by the base portion 30'. The second body 32 is mounted on the first body so that it can turn about a second axis II substantially orthogonal to the axis of rotation of the first body 31 (and hence also to the aforesaid first direction). Said second body 32 has an elongated shape and is rotatably connected to the first body 31 at one end thereof, whereas mounted on its opposite end is a third body 33, in such a way that it can turn about a third axis of rotation III substantially parallel to the second axis II. Mounted in turn on the third body is a fourth body 34, in such a way that it can turn about a fourth axis of rotation IV substantially orthogonal to the third axis III. Preferably, mounted on the third body 33 is the motor designed to drive the fourth body in rotation. It should be noted that said fourth body has an elongated shape and is connected to the third body 33 at one end thereof, whereas on its opposite end a fifth body 35 is mounted in such a way that it can turn about a fifth axis V substantially orthogonal to the fourth axis IV. Finally, on the fifth body 35 the sixth body 36 is mounted in such a way that it can turn about a sixth axis VI substantially orthogonal to the fifth axis V. Preferably, moreover mounted on said fourth body 34 are the motors designed to drive the fifth 35 and sixth 36 bodies in rotation. As may be seen in the figures, the second and the fourth bodies 32, 34 preferably have a length at least one and a half times the length of the other rotatable bodies of the series.

It should be noted that in the present description the condition of orthogonality between two axes or straight lines can refer both to straight lines or axes incident and perpendicular to one another and to straight lines or axes not incident with respect to one another but the projections of which in one and the same plane parallel thereto form an angle of approximately 90° with respect to one another.

Figure 8:
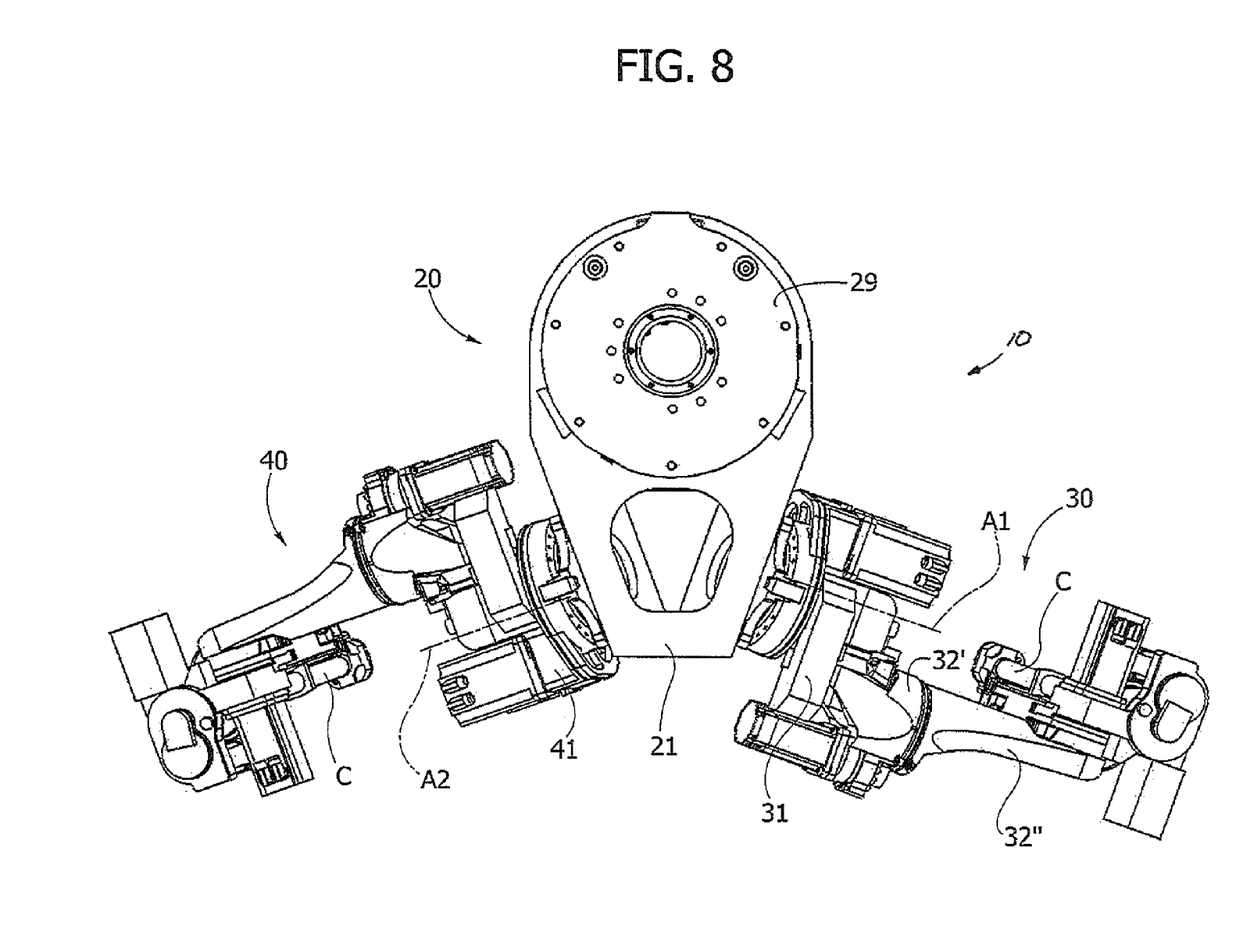
FIG. 8 is a top plan view of the manipulator robot of FIG. 6.
Figure 9:
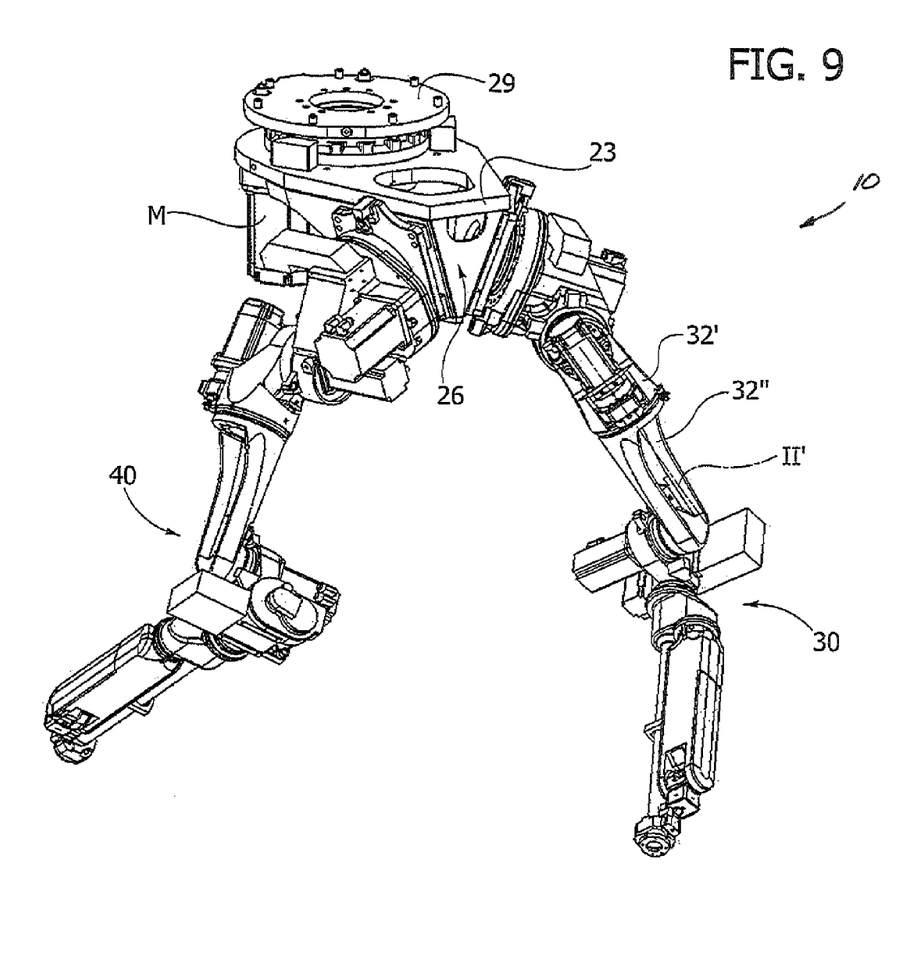
FIG. 9 is a perspective view of the manipulator robot of FIG. 6 in an operative configuration thereof.
Figure 10:
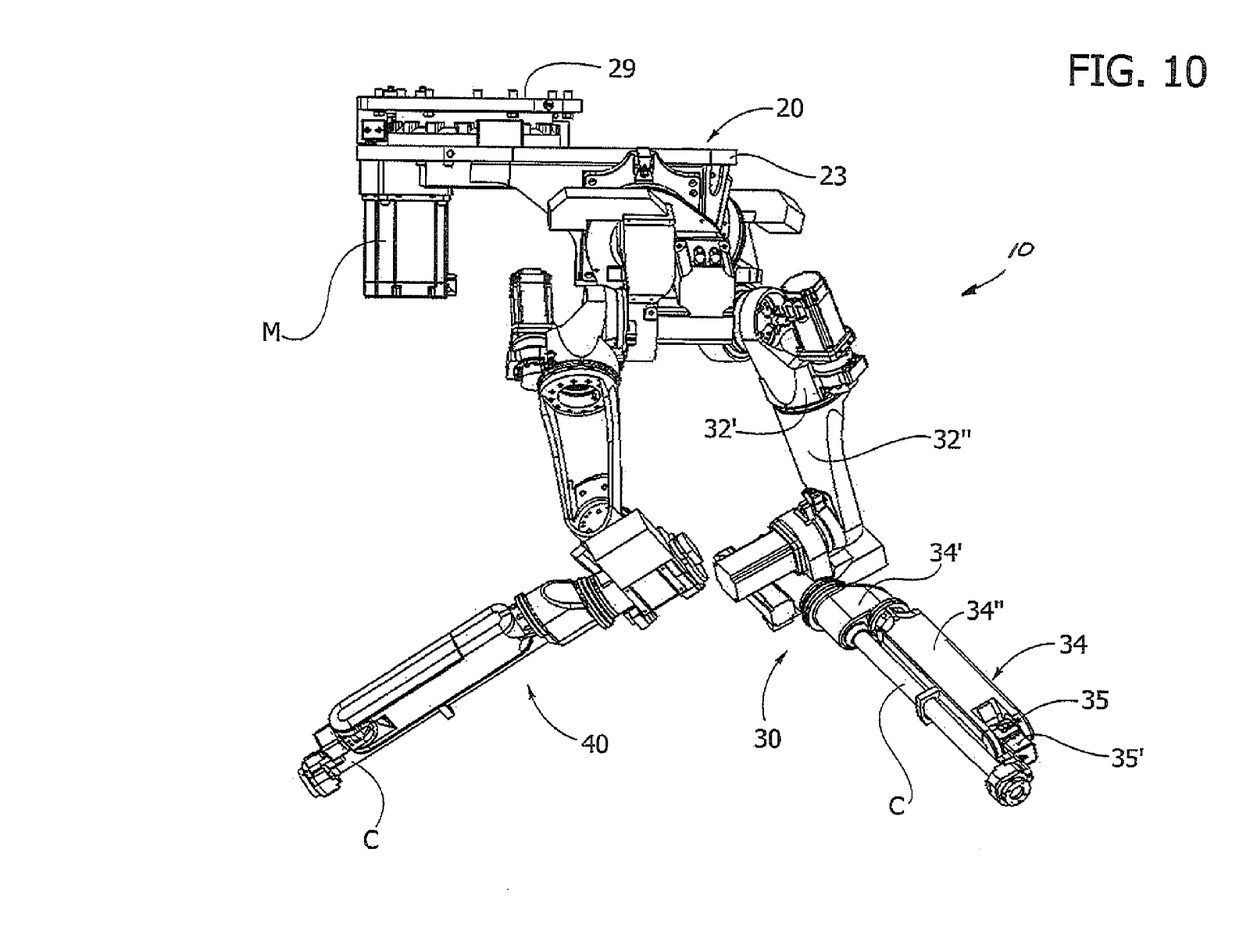
FIG. 10 is a side view of the manipulator robot of FIG. 9.

An alternate example of manipulator robot 10 is shown in FIGS. 6-10, in the specific embodiment of FIGS. 6 to 10, the second body 32 of the arms illustrated in FIGS. 1 to 5 is replaced with two portions 32' and 32" that are able to turn with respect to one another about an axis of rotation II', substantially orthogonal to both of the axes II and III. In the example, the portion 32' is rotatably mounted on the first body 30, about the axis II, and moreover carries the motor designed to drive in rotation the portion 32", whereas the latter is preferably elongated, and mounted thereon so that it can turn about the axis of rotation III is the third body 33. Thanks to the configuration described above, the robot arms 30 and 40 illustrated in FIGS. 6 to 10 are, to all effects, provided with a seventh axis of rotation, which bestows thereon greater dexterity and a greater operating capacity. In this connection, FIGS. 8 and 9 illustrate a configuration of the arms 30 and 40 obtained starting from the configuration illustrated in FIGS. 5 to 7, as a result of rotation of their respective portions 32" about the axes II'.

With specific reference to the two embodiments of robot arm discussed above, it should moreover be noted that their respective fourth, fifth, and sixth bodies 34, 35, 36 form together a robot wrist that is characterized in that it provides a passage for the cables and/or pipes C for supply and control of the tool (not shown) that is associated to the sixth body 36 of the robot arm, which is, at one end, substantially aligned to the fourth axis of rotation, and, at the opposite end, substantially aligned to the sixth axis of rotation. In this way, said cables and/or pipes are contained within the overall dimensions defined by the structure of the respective robot wrist, consequently preventing the risk of one of the two arms getting entangled in the cables carried by the other arm. It may once again be noted that the fourth body 34 comprises a substantially elbow portion 34', which has, at its base, a first opening (not visible) that faces the fifth body 35 and the sixth body 36. Said first opening is substantially aligned to the fourth axis IV. Moreover, the elbow portion 34' carries a non-aligned portion 34", which is substantially set alongside and at a distance from the axis of the aforesaid opening and rotatably mounted on which about the fifth axis V is the fifth body 35. The fifth body 35 has, instead, a cantilever portion 35', which has a second opening (not visible) substantially aligned with the sixth axis VI. In the condition where the robot is installed and equipped the first and second openings are both traversed by the aforesaid cables and/or pipes C. The non-aligned portion 34" of the fourth body 34 has, on its end opposite to the elbow portion 34', a fork portion 34'''. Said fork portion 34''' is set alongside and at a distance from the axis of the aforesaid opening of the elbow portion and mounted thereon so that it can turn about the second axis V is the fifth body 35.

The specific type of robot arm illustrated above is particularly advantageous in view of its compact structure, which enables the arms themselves of the manipulator robot to operate also in mutual positions where they are set close to one another.

Finally, it should be noted that, even though in the present description reference has always been made to a manipulator robot comprising two arms of one and the same type, it is also possible to envisage, in the cases and in the terms where this may be advantageous, arms of different types.

Of course, without prejudice to the principle of the invention, the details of construction and the embodiments may vary, even significantly, with respect to what is illustrated herein purely by way of non-limiting example, without thereby departing from the scope of the invention, as defined by the annexed claims.

What is claimed is:

1. A manipulator robot for use in industrial production lines, comprising:
    a supporting structure;
    a first robot arm mounted in a suspended condition on said supporting structure and comprising a plurality of bodies connected in series and rotatable with respect to one another and with respect to said supporting structure about respective axes of rotation;
    a second robot arm mounted in a suspended condition on said supporting structure and comprising a plurality of bodies connected in series and rotatable with respect to one another and with respect to said supporting structure about respective axes of rotation;

first and second means for mounting, respectively, said first and second arms on said supporting structure, wherein the axis of rotation of a first rotatable body of said first arm, which is the closest of said plurality of bodies to said supporting structure, identifies a first direction (A1), and wherein the axis of rotation of a first rotatable body of said second arm, which is the closest of said plurality of bodies to said supporting structure, identifies a second direction (A2), said manipulator robot being characterized in that said first and second means for mounting orient, respectively, said first body of said first arm and said first body of said second arm in such a way that said first and second directions are inclined with respect to a horizontal plane by an angle comprised between about 0° and 90°, and divergent downwards away from said support structure such that their respective projections onto the horizontal plane are angled at an angle less than about 180°.

2. The manipulator robot according to claim 1 wherein said supporting structure comprises a rotary platform able to turn about a substantially vertical axis of rotation on which said first and second arms are mounted.

3. The manipulator robot according to claim 2 wherein said first and second arms are mounted on said platform in respective positions in cantilever fashion with respect to said axis of rotation of the platform.

4. The manipulator robot according to claim 2 wherein said platform has a first inclined wall defining said first mounting means, fixed on which is a base portion of said first arm that carries said plurality of rotatable bodies of said first arm, and a second inclined wall defining said second mounting means, fixed on which is a base portion of said second arm that carries said plurality of rotatable bodies of said second arm, said first and second walls being inclined in such a way that respective geometrical axes orthogonal thereto define said first and second directions.

5. The manipulator robot according to claim 4 wherein said platform has at a bottom a half-shell defining said first and second walls.

6. The manipulator robot according to claim 1 wherein said first and second mounting means are such that said first and second directions are symmetrical to one another with respect to an intermediate vertical geometrical plane.

7. The manipulator robot according to claim 1 wherein said first and second arms comprise each at least six rotatable bodies mounted in series with respect to one another and able to turn about as many respective axes of rotation.

8. The manipulator robot according to claim 1 wherein two rotatable bodies of each of said first and second arms have a length that is at least one and a half times longer than a length of each of the remaining rotatable bodies of the respective series of bodies.

9. The manipulator robot according to claim 8 wherein positioned between said two longer bodies is at least one of said remaining bodies of said series of bodies.

10. The manipulator robot according to claim 1 wherein said first and second mounting means are such that said first and second directions define between them an angle comprised between about 90° and 180°.

11. A manipulator robot for use in industrial production lines, comprising:
   a support structure including a rotary platform having a first inclined wall, a second inclined wall angularly separated from the first inclined wall and a front face positioned between the first and the second inclined walls, the first and the second inclined walls defining respective first (A1) and second (A2) directions oriented angularly downward from the support structure with respect to a horizontal plane by an angle comprised between about 0° and 90° and angularly divergent from one another away from the support structure such that their respective projections onto the horizontal plane are angled at an angle less than about 180°;
   a first robot arm connected to the first inclined wall, the first arm having a first axis of rotation along the first direction (A1); and
   a second robot arm connected to the second inclined wall, the second arm having a first axis of rotation along the second direction (A2), each of the first and second robot arms including a plurality of bodies connected in series and rotatable with respect to one another and with respect to said supporting structure about respective axes of rotation.

12. The manipulator robot according to claim 11, wherein the first (A1) and second (A2) directions are symmetrical to one another with respect to an intermediate vertical geometrical plane.

13. The manipulator robot according to claim 11 wherein each of the first and second arms comprise at least six rotatable bodies mounted in series with respect to one another and rotatable about as many respective axes of rotation.

14. The manipulator robot according to claim 13 wherein two rotatable bodies of each of said first and second arms have a length that is at least one and a half times longer than a length of each of the remaining rotatable bodies of the respective series of bodies.

15. The manipulator robot according to claim 14 wherein positioned between said two longer bodies is at least one of said remaining bodies of said series.

16. The manipulator robot according to claim 14 wherein the first (A1) and second (A2) directions define between them an angle comprised between 90° and 180°.

17. The manipulator robot according to claim 13 wherein one of the rotatable bodies comprises a first portion and a second portion, the second portion rotatable about an axis of rotation relative to the first portion.

18. The manipulator robot according to claim 1 wherein said supporting structure is configured such that said first and second arms are suspended over a working area in which the manipulator robot is designed to operate.

\* \* \* \* \*